United States Patent

[11] 3,582,664

| [72] | Inventor | Jiri Hrdina |
| | | 8 Na Stahlavce, Prague, Czechoslovakia |
| [21] | Appl. No. | 697,806 |
| [22] | Filed | Jan. 15, 1968 |
| [45] | Patented | June 1, 1971 |

[54] COMPENSATED PHOTOELECTRIC MEASUREMENT OF FLUIDS
7 Claims, 5 Drawing Figs.

[52] U.S. Cl. ........................................ 250/226, 250/218, 356/186, 356/206
[51] Int. Cl. ........................................ G01j 3/34, G01j 3/48, G01j 21/22
[50] Field of Search ........................................ 356/184, 186, 189, 206; 250/226, 218

[56] References Cited
UNITED STATES PATENTS
| 2,336,550 | 12/1943 | Kruper | 250/226X |
| 2,424,858 | 7/1947 | Senn | 250/226 |

FOREIGN PATENTS
| 127,502 | 11/1967 | Czechoslovakia | 356/206 |
| 1,511,411 | 12/1967 | France | 356/206 |

OTHER REFERENCES
Hrdina, Jiri, Vynalezy, November 15, 1967, page 24.

*Primary Examiner*—James W. Lawrence
*Assistant Examiner*—T. N. Grigsby
*Attorney*—Paul H. Smolka ABSTRACT: A flow-through cell analyzer using a compensating photoelectric circuit indicating the ratio of light passing through a measuring cell and light impinging on the cell. A source of light projects a beam which is controlled, for example, by different filters and which is split into two equivalent beams going to respective photoelectric cells the outputs of which are compared, one of the cells providing a reference voltage which is kept constant by varying the intensity of the light source or by the use of filters or diaphragms.

INVENTOR.
JIRI HRDINA

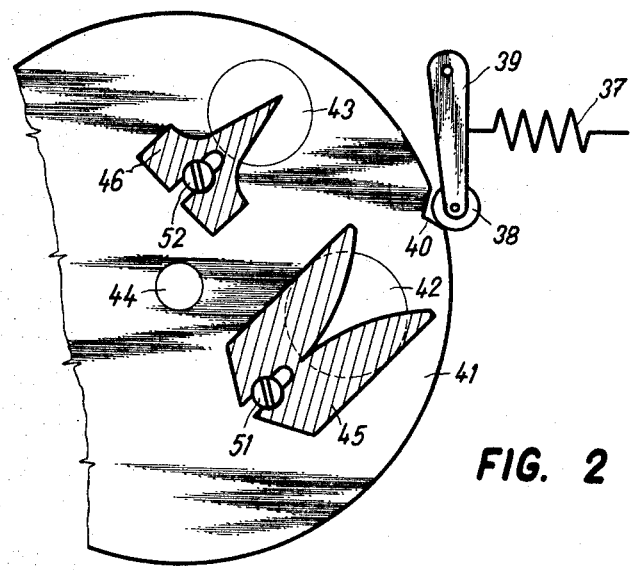
FIG. 2
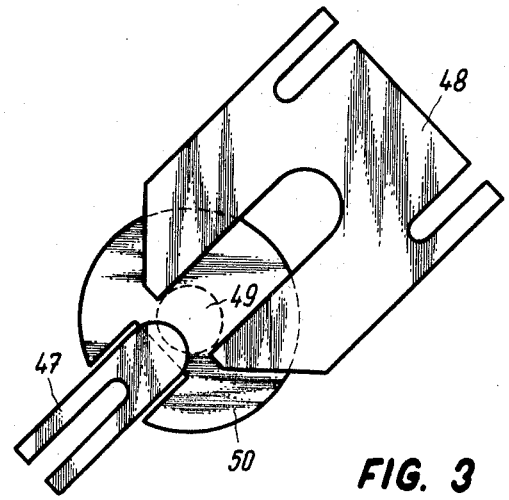
FIG. 3
INVENTOR.
JIRI HRDINA
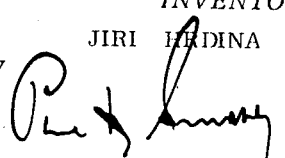
Attorney

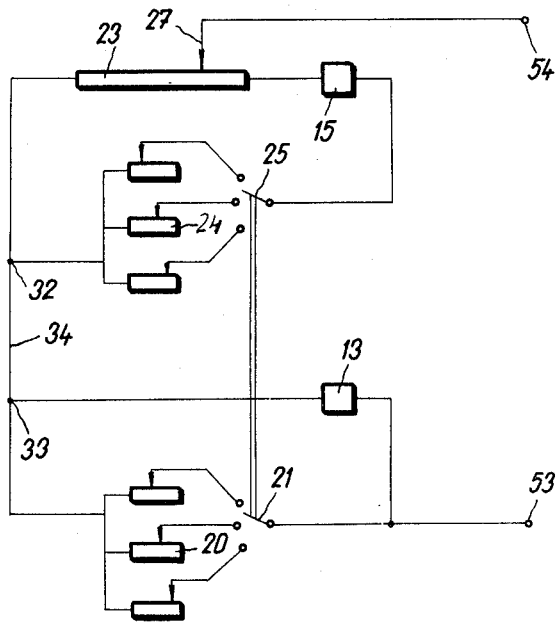
FIG. 4
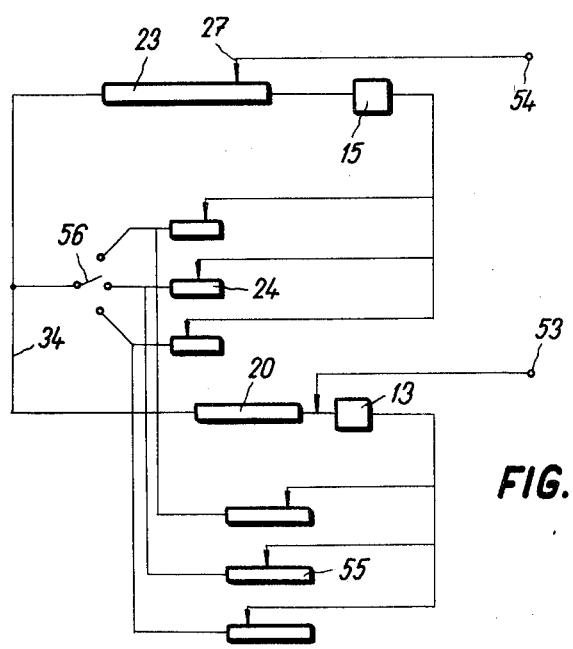
FIG. 5
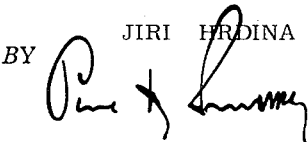

COMPENSATED PHOTOELECTRIC MEASUREMENT OF FLUIDS

BACKGROUND OF INVENTION

This invention relates to devices and techniques for photoelectric measurements in several spectral or sensitivity regions, and more particularly to devices using flow-through photometers with a main measuring photoelectric cell and a reference photoelectric cell gauged with a compensation recording device indicating the ratio between a luminous flux passed through a measuring cell of the photometer and the luminous flux impinging on the measuring cell.

Certain laboratory work using flow-through analyzers for mixtures of amino acids and similar materials and other devices or laboratory techniques require the current or continuous measurement, in several modes of operation, of the photometric extinction of a liquid which changes its composition due to the fact that it carries with it, in different phases of its passage, different doses in different quantities. The purpose of photometering is to ascertain extinction in one or several measuring cells through which flows a liquid varying composition.

In order to obtain different photometric modes of operation, use is made of different wave lengths of chromatographic light in which extinction is ascertained, and sometimes use is also made of a varying photometric sensitivity. The change in the photometric sensitivity is achieved by ascertaining photometric extinction in the individual modes of operation over paths of varying lengths along which the light must travel when penetrating a layer of the tested material in the measuring cell of the photometer.

For analyzers of amino acids, the above problem is most frequently solved by using a three channel photometer. The first channel measures at one wave length and at full photometric sensitivity; the second channel measures at another wave length and also at full photometric sensitivity; and the third channel measures at the same wave length as the first channel but at reduced sensitivity such as, for example, at one third of the sensitivity of the first channel. Each channel uses either a separate lamp as a light source, or a single lamp serves as light source for all three or even more channels which are radially arranged around this lamp. The luminous intensity of the lamp or lamps of the individual channels is maintained accurately at the same value so that the luminous flux impinging on the individual measuring cells may be considered constant. To ascertain the photometric extinctions it is sufficient to carry out absolute measurement of the luminous flux or luminous fluxes which passed through the individual measuring cells. This simplification however, presents difficulties because it is technically very difficult to maintain the luminous intensity of the lamp or lamps constant.

To avoid this difficulty, it has been proposed to illuminate, with a light source used for the photometric measurement proper, also a reference photoelectric element either directly or through a means restricting a certain spectral region, the signal of this reference photoelectric cell being proportional to the luminous intensity of the lamp. This signal is then processed in a known manner together with the signal of one or more photometers proper.

The evaluation device which is usually an electronic compensation recorder of the line or multidot type does not record the absolute value of the luminous flux which has passed through the measuring cell. Instead it records the ratio between this luminous flux and the luminous flux impinging on the measuring cell. It is assumed that this incident luminous flux is very accurately proportional to the luminous flux incident on the reference photoelectric sensing cell, or the electric signal produced by this sensing cell as a reaction on the luminous flux incident thereupon.

It has also been proposed to use a single channel instead of several separate photometric channels. In this channel, the spectral mode of operation employed in the photometric measurement is changed by gradual intermittent exchange of absorbing or interference filters, or by changing the geometry of the passed beam which is split into its spectral components by a prism, grid or the like. It is also possible to use diaphragms or slits of variable width which, together with a change of the spectral mode of operation vary the magnitude of the luminous flux to comply with the fundamental requirements made in connection with a photometric system.

It is a condition of the above mentioned known method which indicates the ratio between the luminous flux which has passed through the measuring cell and the luminous flux impinging on the measuring cell that the spectral composition of the luminous flux which has passed through the measuring cell be identical with the spectral composition of the luminous flux impinging on the reference photoelectric element. If another spectral region is involved, variations in the supply voltage of the lamp filament change the ratio between the energies radiated from the filament in different spectral regions with different degrees of heating. If these regions are not identical for the photometric channel proper and the reference photoelectric element then, in the case of variations in the heating of the lamps, the above mentioned assumption cannot be realized. To avoid this, the lamp requires a rather complicated stabilization system to keep the mentioned interfering effects within acceptable limits.

This fundamental drawback can be removed either by associating with each individual photometric channel a separate reference element, or by associating in common with all channels a single reference element in which the spectral mode of operation is alternated so that it is always the same for the main and reference sensing element, or that the measurement is accomplished by a single photometric channel with a common main and reference photoelectric element used for all photometric modes of operation, the spectral mode of operation being changed in such a manner that it remains the same for both photoelectric members. However, the total transmittance, and thus also the magnitude of the luminous flux in the individual alternating modes of operation are usually very different for different spectral modes of operation. In addition, with different spectral modes of operation, the sensitivities of the photoelectric sensing element and of the source of the employed light are usually very different. The product of the transmittance of the filters, the spectral radiance of the employed source in their spectral regions and the sensitivity of these photoelectric elements in these spectral regions is, only rarely, at least approximately equal. Usually the products of these factors is different for different alternating spectral modes of operation.

Even under conditions where photoelectric signals can be processed in such a manner that their ratio is indicated, there appears another difficulty residing in the fact that, for different magnitudes of luminous fluxes and thus also of signals, even if their ratios are maintained, there is produced a very different directive force in the evaluating device which is usually an electronic compensation recorder with servomotor control. The drawback resides in the fact that the indicating system approaches the balanced state with a varying directive force and therefore at a varying speed, with a varying inclination towards overshooting or even permanent oscillation, or with a varying error in approaching balance. This varying directive force in varying photometric modes of operation can be balanced to a certain extent by changing the amplification of the electronic amplifier of the signal feeding the balancing servomotor of the indicating or registrating system. This balancing possibility however, is limited by the existence of secondary phenomena producing, for example, disturbing effects such as parasitic signals occurring in the entire electronic chain. A still more serious restriction or difficulty is due to the fact that alternation of the photometric regions occurring usually within intervals of a few seconds, requires also a change in the amplification of the amplifier at the same rhythm either by rotation of a regulation knob, or automatically by the changing of a resistor forming a voltage divider which increases usually the sensitivity of the amplifier.

It is a general object of the invention to eliminate the drawbacks of the above-mentioned known state of art.

SUMMARY OF THE INVENTION

A more specific object of the invention is to provide a device for photoelectric measurement in several spectral regions and even in several sensitivity regions using flow-through photometers with a main photoelectric cell cooperating preferably in gang with a recording device of the compensating type indicating the ratio between a luminous flux passed through a measuring cell of the photometer and the luminous flux impinging on the measuring cell.

Stated briefly but more specifically the device in accordance with one embodiment of the invention comprises a measuring potentiometer across which is produced a reference or first voltage proportional to a light flux in front of a measuring cell, means for changing the optical modes of operation, for example by interchanging interference filters in the optical path of the photometer, and means for keeping the said reference voltage at a substantially constant value.

The above and other objects and features of the invention will be best understood from the following specification which is to be read in conjunction with the accompanying drawings illustrating preferred embodiments of the invention.

BRIEF DESCRIPTION OF DRAWING

FIG. 2 diagrammatically illustrates an example of a mechanism for interchanging filters in accordance with the invention;

FIG. 3 diagrammatically shows diaphragms used in the invention;

FIG. 4 shows a schematic diagram of an electric circuit for a main photoelectric cell; and FIG. 5 illustrates another example of an electric circuit for a main photoelectric cell.

DETAILED DESCRIPTION OF ILLUSTRATED EMBODIMENTS

Figure 1:
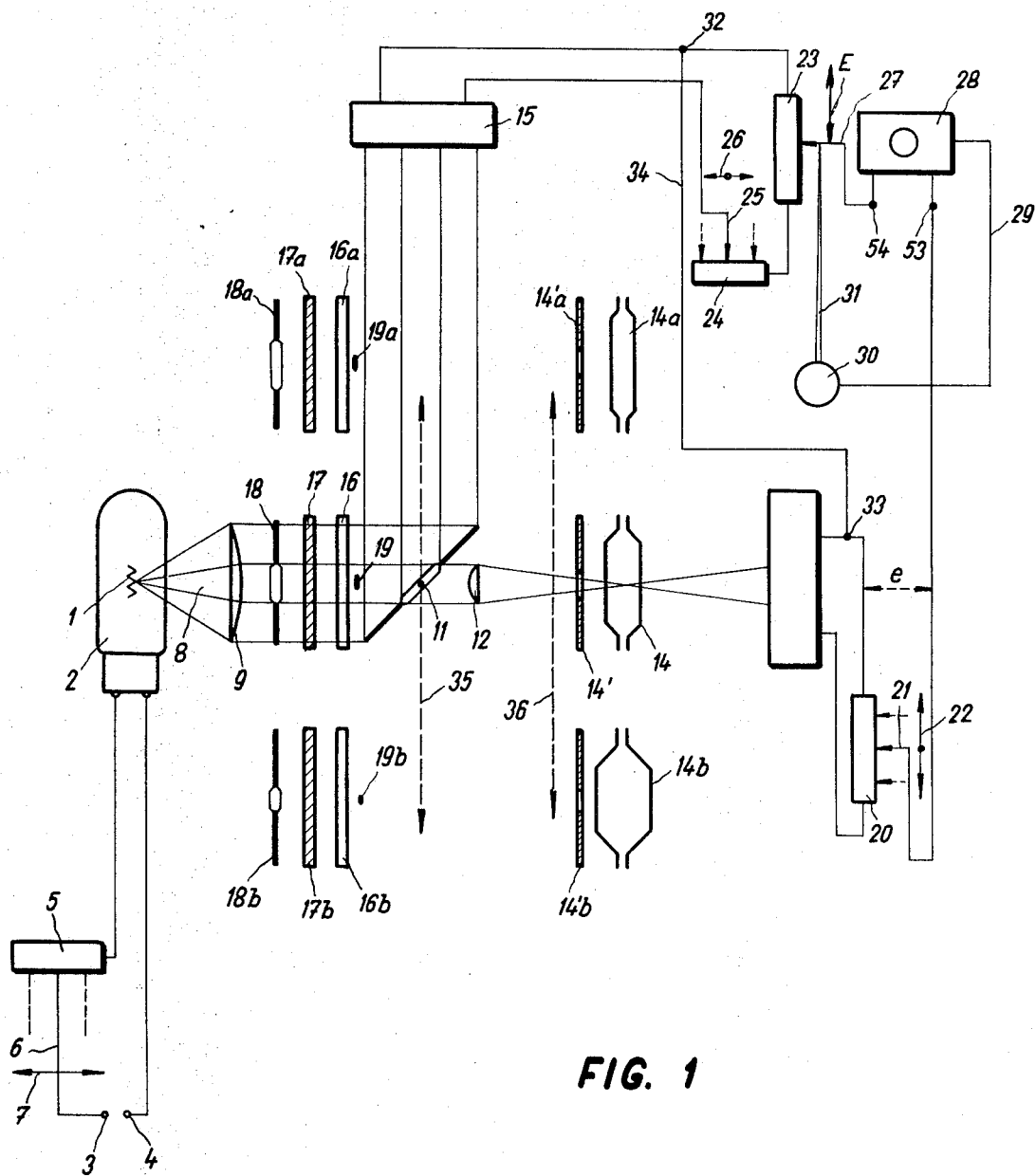
FIG. 1 illustrates schematically the general layout of a device employing main and reference cells in accordance with the invention.

Referring now more particularly to FIG. 1, it should be understood that the luminous intensity of the filament 1 of the lamp 2 is regulated by variations in the voltage supplied from the terminals 3, 4 of a voltage source (not shown) through a rheostat 5. By changing the position of the sliding contact 6 in either direction of the double arrow 7, the luminous intensity can be varied over a wide range. The divergent light beam 8 is transformed by a first lens 9 into a light beam of preferably substantially parallel light rays. This beam is split into two separate divisional beams, for example, by a mirror 10 arranged in an inclined position with a central opening 11. The first divisional beam which is considered to be the main one passes through the opening 11, and if necessary also through a second lens 12, and continues in a direction towards the main photoelectric sensing cell 13. In the path of said main light beam lies a measuring cell 14, its optical transmittance of the measuring cell 14 being limited by a diaphragm 14' which is illustrated as being in front of the cell 14 but which possibly may be placed behind the cell 14; a combination of two such positions may also be used. The other divisional light beam which is reflected from the mirror 10 is directed against a reference photoelectric cell 15. A filter 16, preferably of the interference type, is arranged in the parallel section of the light beam in which there may also be arranged an attenuation filter 17 with no special requirements with respect to spectral sensitivity. This filter 17 acts substantially as a light flux attenuator. Attenuation of the light flux may also be achieved, either in addition or separately, by a diaphragm 18 which has such a geometrical form that it intercepts only those parts of the light beam which impinge on the photoelectric cell 15 after the light beam has been split. The dot 19 indicates symbolically another diaphragm arranged in the path of the divisional light beam which travels through the measuring cell 14 to the main photoelectric sensing cell 13. The screening actions of the diaphragms 18 and 19 are preferably independent of each other.

The photoelectric current of the photoelectric sensing cell 13 produces across the load resistor 20 a voltage $e$ which depends on the position of the sliding contact 21 adjustable in either direction of the double arrow 22. Possibly a plurality of load resistors of different values may be used, their number conforming to the number of alternating photometric working modes.

The photoelectric current of the reference photoelectric cell 15 produces a voltage $E$ across the second resistor 23 in dependence of the position of the sliding contact 27. The voltage $E$ may be preferably finely adjusted by a series resistor 24 whose value may be varied by changing the position of the sliding contact 25 in either direction of the double arrow 26. The same effect (as in the case of the circuit comprising the resistor 20) can be also achieved by a parallel arrangement of additional resistors (not shown).

A portion of the voltage $E$ produced across a portion of the measuring potentiometer 23 and determined by the position of the sliding contact 27 of this potentiometer is compared against the voltage $e$ produced across a portion of the resistor 20. These DC voltages are transformed into AC voltages and after being amplified by the amplifier 28 are led through the line 29 to the balancing motor 30 which responds to the magnitude and the sense of the difference of the two voltages by means of a mechanical gear 31 which varies the position of the sliding contact 27 on the measuring potentiometer 23 until a position is reached where the portion of the voltage $E$ tapped off by the sliding contact just equals the voltage $e$. It is assumed that the two voltages $e$ and $E$ can be compared by connecting the points 32 and 33 by the line 34 or by equivalent means allowing a comparison of the two voltages.

In the above mentioned optical and electrical arrangement, the position of the sliding contact 27 with respect to the measuring potentiometer 23 remains unchanged even if, for example, the luminous intensity of the filament 1 of the lamp 2 is changed. This is true, particularly if there are larger changes of the light flux radiated from the filament 1, only if the light fluxes falling on the main photoelectric cell 13 and the reference photoelectric cell 15 remain exactly proportional. This however can be accomplished only if the spectral composition of the light fluxes falling on the photoelectric cells 13 and 15 out of the total spectral range of radiation radiated from the filament 1 of the lamp 2 is the same.

The above condition can best be met if two completely equal filters, or just one filter, will pass from the entire light flux radiated by the filament 1 of the lamp 2 only that spectral part whose spectral composition will remain exactly the same for the two photoelectric cells 13 and 15 under all conditions.

This can be readily achieved if for example, the spectrally acting filter such as the interference filter 16 is placed in the section of the propagated light beam in which the rays are substantially parallel (before the beam is split into two parts) so that the spectral transmittance of the filter substantially is the same for all rays. With respect to geometrical optical conditions, it will be convenient if the central part of the beam continues to travel in the direction towards the cell 14. On the other hand, the central part of the beam will lend itself best for transformation in a manner securing creating of the image of the filament in the vicinity of the center of the cell 14 with a minimum of geometrical optical aberrations. On the other hand, the narrow central beam can pass through the cell 14 in a manner which secures in an optimal and as far as possible equal extinction path in the measured content of the inner volume of the cell 14. The peripheral portions of the beam which are diverted by the mirror 10 or by a prism or other device, on the contrary, need not meet the above mentioned requirements for the passage of light rays through the cell 14. It is sufficient if the peripheral portions of the luminous flux are led to the reference sensing cell 15.

Although the splitting of the beam in the above-mentioned manner, for example by means of a mirror 10 with a central opening 11 appears to be best, this can also be achieved by other satisfactory known methods. If the light beam is, for example, split by means of a prism which diverts only the upper half of the beam of parallel light rays after their passage through the lens 9, filter 17, and also any associated other optical elements, worse conditions arise for imaging the filament 1 in the cell 14, but the results may nevertheless be of an acceptable quality.

A change in the required photometric modes of operation in the case of the fundamental arrangement shown in FIG. 1 can be obtained by succeedingly substituting filters 16a and 16b for the single filter 16. As stated above, it is practically impossible for interference filters 16, 16a and 16b, which are to be used alternately in a photmetric channel, to possess with different spectral transmittances accurately, or only approximately, the same total transmittance, or a transmittance which in combination with the spectral radiance of the filament 1 and the spectral sensitivity of the photoelectric elements 13 and 15 results in approximately the same photoelectric effects. Different photometric modes of operation can be achieved not only by using different filters 16, 16a and 16b as symbolically indicated in FIG. 1 by the double arrow 35, but also by using different measuring cells 14, 14a, 14b as symbolically indicated by the double arrow 36.

The above-mentioned conditions are generally contradictory to the requirement of equal dynamic properties under any photometric mode of operation because a change in the optical transmittance leads generally also to a change in the voltage on the measuring potentiometer 23 of the indication device. Such change however, can be compensated in accordance with the invention by the various means indicated in FIG. 1, either separately or in combination.

Thus for example, changes in the transmittance occurring due to interchanging the filters 16, 16a, 16b can be compensated for by changing the value of the series resistor 5 in the direction of the double arrow 7 or by another equivalent means which changes in a similar manner the luminous intensity of the filament 1 of the lamp 2, or generally of any other source of radiating light. Compensation obtained in this manner is advantageous particularly if changes of the filters follow each other after long intervals, as for example in he case of analyzers of amino acids. Evaluation of the individual separated amino acids involves substantially measurement in only one spectral mode of operation for all components except proline and hydroxyproline which require instead of the normal spectral mode of operation of approximately 550 m one of approximately 440 m . In current analyses of normal amino acids, there will be involved during one complete analysis only one change of the luminous intensity of the filament 1 and this only for a relatively short period when through the cell of the photometer flows an eluent which carries a dye produced by reaction of a dye forming ninhydrine agent with proline.

This means for carrying out the invention is however, less suitable where the photometric modes of operation have to be changed within short time periods, for example of 3 seconds. In such cases it is more convenient to exchange concurrently with the filters 16, 16a and 16b the attenuation filters, such as the grey filters 17, 17a, 17b. A similar reducing effect on the luminous flux in the individual modes of operation without changing the spectral composition can be achieved by exchanging the diaphragms 18, 18a, 18b or the diaphragms 19, 19a, 19b, respectively, or also of the diaphragms 14', 14'a, 14'b. Like filters 17, 17a, 17b, the diaphragms 14', 14'a, 14'b are interchanged and are effective in the photometric channel, simultaneously with an interchange of the spectrally effective filters 16, 16a, 16b. Though the mentioned means may be used separately that is for example independently only one of them, the combination of these means is particularly convenient. The reduction filters 17, 17a, 17b compensate approximately the spectral efficiency of the respective photometric modes of operation and an accurate correction of the required magnitude of the luminous fluxes can be achieved by a fine adjustment of the diaphragms 18, 18a, 18b, or 19, 19a, 19b, or also of the diaphragms 14', 14'a, 14'b. Rearrangement of the last-named diaphragms in either direction of the double arrow 36 is of course more difficult mechanically than rearrangement of the other elements which, after proper adjustment, can be mechanically easily attached in close contact with the spectral filters 16, 16 a, 16b whose interchange is accomplished mechanically by swinging or rotation of a supporting member 41 (FIG. 2) to which these filters are attached together with the other adjustment elements.

FIG. 2 illustrates in more detail an example of a simple mechanical adjustment means. In this embodiment a roller 38 loaded by a spring 37 drops into notches 40 in the circular circumference of a supporting disc or segment 41. This disc 41 is provided with two or more slots 42, 43 into which filters are set. The disc 41 is rotatable about a rigid axis 44 so that the required filter mounted in one of the slots 42, 43 is brought into position by engagement of a corresponding notch 40 with the roller 38. FIG. 2 also shows examples of diaphragms to be used in the invention. The diaphragm 45 is designed for restricting rays of the luminous flux in the peripheral parts of the beam which are reflected from the mirror 10 in the direction of the photoelectric reference element 15 and fall thereupon. The diaphragm 46 is primarily designed for reducing the luminous flux which has passed through the central opening 11 in the mirror 10 of FIG. 1 and after passing through further elements falls on the photoelectric element 13. By proper selection of the geometrical shapes and areal extents of the diaphragms 45 and 46 and by their careful adjustment it is possible to achieve the correct functioning of the entire device under all photometric modes of operation even without switching over electrical elements. This has the advantage of avoiding complications occurring sometimes due to the fact that it is difficult in continuous operation to maintain sufficiently low and stable contact resistances in switches and other elements to prevent changes in these resistors from interfering with the passage of photoelectric currents of a low voltage.

Correct functioning of the entire device however, can also be achieved by a purely electrical means as indicated schematically in FIG. 1, for example by changing the value of the series resistor 24 arranged in the circuit of the reference photoelectric sensing cell 15 and the measuring potentiometer 23. A change in the value of the resistor 24 can be achieved for example mechanically by shifting the sliding contact 25 in either direction of the double arrow 26 when changing the photoelectric mode of operation, or by switching resistors 24 of different values adjustable by sliding contacts into a circuit which determines the magnitude of the voltage on the measuring potentiometer 23. In a similar manner a change in the value of the load resistor 20 in the circuit of the main photoelectric sensing element 13 can be accomplished as indicated symbolically by the double arrow 22.

For practical reasons the magnitude of the resistance of the measuring potentiometer 23 is restricted to relatively low values ranging from a few hundred ohms to a maximum of approximately 1,000 ohms because higher ohmic values would result either in a too thin resistance wire or in an excessively bulky potentiometer. The relatively low values of the resistor 23 can be advantageously used in the complete circuit arrangement because for the reference photoelectric sensing element 15 (for example, a simple barrier selenium cell) it is easy to secure a sufficiently large luminous flux falling thereupon to achieve a sufficiently high voltage $E$ on the measuring potentiometer 23 which would allow in normally designed compensating tube recorders to obtain regular operating conditions.

On the other hand, the luminous flux available for the main photoelectric sensing element 13 is usually very restricted particularly if there are used long measuring cells with a desirable small cross section. If there is no danger of producing large deviations from a linear relationship between the measured electric voltage and the incident measured luminous flux, the value of the resistor 20 is conveniently selected substantially larger, for example 10 to 30 times larger, than the value of the resistance of the measuring potentiometer 23. Insertion of the switch into the circuit of the main photoelectric element 13 then represents a smaller danger to the permanent operational accuracy of the entire device. Varying contact resistances of the switch are effective to a substantially smaller degree in this circuit than in the circuit of the measuring potentiometer 23. For these reasons, there are particularly convenient combinations of series reducing filters 17, 17a, 17b and adjustable diaphragms 18, 18a, 18b for that portion of the beam which determines the luminous flux impinging on the reference photoelectric element 15. These combined means allow to attain with sufficient accuracy an at least substantially constant voltage $E$ on the measuring potentiometer 23 when the photometric modes of operation change even without application of electrically variable elements. The necessary adjustment of the voltage $e$ can be conveniently achieved by changing the resistor 20 by a switch which switches in the individual rheostats and potentiometers whose sliding contacts can be individually adjusted to achieve for each photometric mode of operation a suitable value of the respective accurately regulable resistor.

FIG. 3 shows schematically one exemplary arrangement of the diaphragms 47, 48 independently permitting a restriction of the central region 49 of a light beam impinging on the photoelectric sensing cell 13 and of the peripheral part 50 of a light beam impinging on the reference photoelectric sensing cell 15.

For the purpose of fine continuous regulation, the ends of diaphragms 47, 48 may have any suitable shape for example as indicated in FIG. 2, or each diaphragm may be divided for example into two parts of which one is intended for rought regulation and the other for fine regulation said parts being designed so that even in the case of a larger mutual shift the profile of the area through which light passes is changed only by a small portion. Of course other known means may be used which insure a very fine adjustment movement, for example microscrews, eccentrics or the like.

FIG. 4 illustrates schematically an example of the electric network of the main photoelectric element 13 and of the reference photoelectric element 15. In the circuits of these photoelectric elements, there are connected regulating resistors 20 or 24, each of them in numbers which correspond to the number of employed photometric channels; they are switched one after the other into the respective circuit by a switch 21 or 25. The two circuits are connected by a line 34. The voltage produced across the load resistor 20 in the circuits of the main photoelectric cell 13 is compared against the voltage tapped off by the sliding contact 27 from the measuring potentiometer 23. Both voltages are measured with respect to the line 34 by taking them to the input terminals 53, 54 of an amplifier 28 (see FIG. 1).

FIG. 5 illustrates schematically an example of a modified electric network. Here, only one switch 56 is used which connects over to the line 34 one of the resistors 24 with the resistors 20 and 23 associated, respectively, with the sensing cell 13 and the photoelectric reference cell 15. Each of the resistors 24 is permanently connected to one corresponding additional resistor 55. These resistors 55 reduce the current in the circuit of the photoelectric element 13. This photoelectric element 13 produces on the nonvariable load resistor 20 a voltage which is supplied to the input terminal 53 of the here not shown but in FIG. 1 illustrated, amplifier 28. Since, for the above-mentioned reasons, the ohmic value of the resistors 55 can be very substantially larger than those of the resistors 24, it will not matter that they remain permanently connected with the circuit of the reference cell 15.

Although certain embodiments of my invention have been shown and described by way of illustration, it will be understood that my invention may be otherwise embodied within the scope of my appended claims.

What I claim as my invention is:

1. A method for photoelectric measuring of specimens within a measuring cell including the steps of forming a beam of substantially parallel light rays from a light source, directing a first portion of said light rays through a flow cell and into a sensing photoelectric member, directing a second portion of said light rays upon a referential photoelectric member, and comparing the output of said photoelectric members wherein the improvement comprises the steps of: selecting one of a plurality of interchangeable spectrally acting filters; passing said beam of substantially parallel light rays emanating from a controllable light source through said selected one interchangeable spectrally acting filter prior to directing said second portion of said light rays upon a referential photoelectric member; maintaining a constant reference voltage from said referential photoelectric member; selecting one of a plurality of interchangeable measuring cells and passing said first portion of said rays through said selected one of a plurality of interchangeable measuring cells toward and into said sensing photoelectric member.

2. A method according to claim 1 wherein the reference voltage is kept constant by varying the intensity of the light source.

3. A method according to claim 1 wherein the reference voltage is kept constant by the use of differing filters.

4. In apparatus for measuring the extinction of light passing through a flow cell of the type having a light source emitting a beam of light which passes through the flow cell and impinges on a measuring photoelectric cell on the opposite side of the flow cell and including optical means for arranging said light beam in parallel rays and for reflecting a portion of said parallel rays to a reference photoelectric cell for comparison with light impinging on the measuring photoelectric cell, the improvement comprising a plurality of filters, mounting means positioning said filters in the path of said parallel light rays, and means connected to said mounting means for selectively adjusting the proportion of light reflected to said reference photoelectric cell relative to the light impinging on said flow cell.

5. In the apparatus according to claim 4 wherein said reflecting means includes a mirror having a central opening through which a portion of said light beam passes and impinges on said flow cell, another portion of said light beam being reflected by said mirror to said second photocell, said proportion adjusting means including means for screening said light rays from portions of said mirror while allowing the remainder of said light rays to impinge on other portions of said mirror and to pass through said openings in said mirror.

6. In the apparatus according to claim 5 wherein said proportioning means includes a rotary disc having openings therein movable into alignment with said light beam, and screens on said disc, said screens being shaped to cover a greater area of said openings adjacent the margin thereof than adjacent the center thereof.

7. In the apparatus according to claim 4 including adjustable resistances in said electrical circuit interconnecting said reference photoelectric cell and said measuring photoelectric cell, whereby adjustment of said resistances provides compensation for variations in proportionality between light impinging on said reference photoelectric cell and on said measuring photoelectric cell.